US008704446B2

(12) United States Patent
Gibbs

(10) Patent No.: US 8,704,446 B2
(45) Date of Patent: Apr. 22, 2014

(54) SOLID STATE LIGHT AC LINE VOLTAGE INTERFACE WITH CURRENT AND VOLTAGE LIMITING

(75) Inventor: Duane Gibbs, Tustin, CA (US)

(73) Assignee: Emeray, LLC, Meriden, CT (US)

( * ) Notice: Subject to any disclaimer, the term of this patent is extended or adjusted under 35 U.S.C. 154(b) by 0 days.

(21) Appl. No.: 13/068,844

(22) Filed: Mar. 3, 2011

(65) Prior Publication Data

US 2012/0248986 A1    Oct. 4, 2012

Related U.S. Application Data

(60) Provisional application No. 61/310,218, filed on Mar. 3, 2010.

(51) Int. Cl.
*H05B 37/00*    (2006.01)
(52) U.S. Cl.
USPC ............................ 315/122; 315/297; 361/93.9

(58) Field of Classification Search
USPC ..................... 315/122, 185 R, 291, 297, 307; 361/93.9, 91.1, 79; 323/274–277, 280
See application file for complete search history.

(56) References Cited

U.S. PATENT DOCUMENTS

| | | | | |
|---|---|---|---|---|
| 6,952,334 | B2 * | 10/2005 | Ball et al. ...................... | 361/93.9 |
| 2004/0140774 | A1 * | 7/2004 | Chang ......................... | 315/185 R |
| 2010/0259188 | A1 * | 10/2010 | Cheng et al. .................. | 315/294 |
| 2010/0295460 | A1 * | 11/2010 | Lin et al. ....................... | 315/193 |

* cited by examiner

*Primary Examiner* — Daniel D Chang
(74) *Attorney, Agent, or Firm* — George P. White

(57) ABSTRACT

An analog electronic circuit for driving a string of LEDs including input terminals for accepting connection to AC voltage, a current regulation circuit operatively coupled to receive an AC voltage from the input terminals and to provide an output for connection to drive the string of LEDs. Included is a current regulation circuit configured to limit the current flow through the string of LEDs on a half-cycle basis to a predetermined value. Also disclosed is an over voltage circuit configured to switch off electrical connection between the AC voltage and the string of LEDs upon the AC reaching a predetermined high voltage value on a half-cycle basis.

13 Claims, 5 Drawing Sheets

SOLID STATE LIGHT AC LINE VOLTAGE INTERFACE WITH CURRENT AND VOLTAGE LIMITING

This application claims the benefit of the U.S. Provisional Application 61/310,218 filed Mar. 3, 2010 by the same inventor.

PURPOSE

This invention is a simple low cost light emitting diode (LED) driver circuit designed to interface directly with the AC line voltages that are used to power lighting in residential, commercial, and industrial settings. This design does not attempt to strictly regulate the current and voltage applied to the lighting element over the complete 360-degree sine wave of the power source. Instead, the circuitry is allowed to shut down during and around the zero volts crossing of the sine wave and will turn on each time the sine wave voltage exceeds a low voltage near 3 volts. The circuitry then monitors the current and voltage and no current flows until the input voltage is greater than the minimum forward voltage for conductance across the LEDs. When the current reaches the limit set for the maximum current, then the current is held to that value until the voltage drops back down to where it cannot support the current. If the input voltage surges and exceeds the maximum level set by the limiting circuit, then the LED current is shut down until the input voltage drops back down below this limit. Thus the peak power dissipated in the circuits and in the LEDs is limited and the components are protected.

This allows the manufacture of a low cost light or replacement lamp that can be plugged or screwed directly into these high voltage power sources, which are typically 100-120 VAC, 60 Hz or 200-250 VAC, 50 Hz in phase to neutral connected services and 208 VAC, 60 Hz in phase to phase connected services. There are some additional advantages to these designs that will be explained such as high Power Factor and low Harmonic Distortion as well as longer life. Some lamp types considered for design using these circuits are the Edison screw replacement bulb and the linear fluorescent bulbs.

BACKGROUND

Solid-state lighting such as those based on light emitting diodes will eventually replace most if not all of the conventional types of lighting that we have today. The main types in use in residential, commercial, and industrial settings are linear fluorescent, compact fluorescent, incandescent, and high intensity discharge. A major attraction of LED lighting is reduced energy costs due to greater efficiency of the technology. Other attractions are that they potentially have a much greater life span than the alternatives and do not contain hazardous chemicals such as mercury as do fluorescent bulbs that can contaminate the water supply when discarded and your house if you break one of the bulbs.

The main detractions with LED lighting today are the high cost of the lamps and in most examples available on the market that I have looked at, substandard performance. However, the technology is advancing at a rapid rate with the efficiency of the LEDs increasing about 84% per year at this time. This efficiency is now beginning to surpass linear fluorescent bulbs at around 100 lumen/watt but is still too expensive to compete well. As the price of LEDs comes down, the cost of the interface circuitry becomes relatively more important making this a timely invention.

Another negative is that the life of the lamps on the market is not reaching the 50K+ hours promised by the LED technology. This can be due to interface component failures such as large electrolytic capacitors that have a limited life that becomes even shorter as ripple current increases. It could also be due to LEDs being stressed by overheating, over voltage, or current spikes in excess of their maximum current rating.

Many companies are looking for a simple low cost method of creating an LED light that can be used with standard AC line voltages (110 VAC, 60 Hz or 220 VAC, 50 Hz). The methods currently available to interface LEDs to high voltages are expensive and require a large amount of area and volume inside of a light bulb or need a separate power supply similar to the ballast in a fluorescent lighting fixture to drive the light bulbs.

These methods typically use an AC to DC power supply with a step down transformer to reduce the voltage below 60 VDC thus accommodating the lower voltage semiconductors that are available for regulating the current supplied to the light. The light output of an LED is a direct function of the current flowing thru it and so it is desirable to regulate this current. The current is often then regulated with a high frequency switching regulator designed for this application using an inductor and capacitor as storage elements and a fly-back diode to re-circulate current between switching cycles.

There is a company that makes a switching regulator integrated circuit (IC) for LED lighting that will accept the high AC voltages directly but the complaint is that they are high priced (due to having no competition at these voltages) and that using them means you will be sole sourced, which is risky from a business standpoint. Another company adapted their power supply IC application designs to show how to produce a power supply for AC to DC with the output current regulated rather than voltage regulated in order to drive a string of LEDs. This is a viable method but once again it is expensive, uses a significant amount of printed circuit board (PCB) space and is sole sourced.

The switching regulator circuits do have an advantage of good efficiency versus most non-switching approaches. In addition, any light flicker will be at the higher switcher frequency rather than the 120 Hz of a linear approach. 120 Hz is not normally visible to the human eye and this is the flicker rate of a standard fluorescent lamp or incandescent lamp. However, switching regulators do have a number of disadvantages that can require additional circuit costs to pass regulatory requirements.

Switchers create high frequency electro-magnetic interference (EMI) that needs to be filtered in order to meet regulations. The AC to DC power supply that is required usually creates harmonic distortion in the current drawn from the power line. This is primarily seen as peak currents much greater than the root-mean-square (rms) current and drawn primarily at the peak of the AC voltage sine wave due to the capacitive current inrush on each AC cycle.

Additional circuitry may be needed to correct the Power Factor (PF) of the lamp to meet regulations. Power Factor is the ratio of real power in watts to apparent power in volt-amps (VA). If the effective load of the LED light is inductive or capacitive then the Power Factor will be less than the ideal 1.0.

In a lighting system using a power supply to produce a DC rail, the PF is typically less than optimum due to the power supply's input and output filter capacitors. These capacitors draw large peak current near the peaks of the input line voltage and much less between peaks. Excessive current peaks cause the peak of the input voltage waveform to be distorted or flattened due to voltage drop in the AC utility service lines. These distortions show up in the voltage and current frequency spectrums of the system as increased odd harmonics. In the usual lighting installation the power supplied is single-phase 120 VAC or 220 VAC connected phase to neutral. In this case the harmonic distortions will be additive on the neutral and can cause the neutral current to be up to 1.73 times greater than the phase current. This can cause the neutral to overheat when the load is within the rating of the service.

PRIOR ART

Methods driving LEDs that have been disclosed in patents and that I have seen in practice include the following:
1. In patent No. US 2008/0054815 A1, a switching regulator is shown that regulates the voltage to the anode of LED strings that are in parallel. Each string has an analog current regulator at its cathode created from a voltage reference, op amp, jfet and sense resistor. Presumably a DC power supply would also be needed at the front end to supply the voltages for the circuitry shown.
2. U.S. Pat. No. 6,388,393 B1 shows ballast formed with a multi-winding transformer driven by a transistor oscillator and an inductor in series with two LEDs connected anti-parallel at the output winding of the transformer. This is also driven by DC so an appropriate power supply would be needed.
3. U.S. Pat. No. 4,866,430 shows a low voltage LED driver created from an LC astable oscillator circuit based on transistors.
4. U.S. Pat. No. 4,211,956 from Jul. 8, 1980 shows an older method of driving LEDs with a Silicon Controlled Rectifier (SCR). This circuit does connect directly to line voltage AC.
5. U.S. Pat. No. 4,939,426 shows various series parallel configurations of LEDs with resistor ballasts to absorb excess voltage. These configurations connect directly to AC but do not use any current regulation or over voltage protection.
6. U.S. Pat. No. 6,936,968 B2 shows the construction of an LED tube for replacement of a linear fluorescent bulb with various configurations of LEDs. The drive electronics is shown as a series DC blocking capacitor to hold off excess voltage in the case that the forward voltage of the LED string is less than the input voltage. This is followed by a bridge rectifier with a bulk storage capacitor across its output terminals and across the load. It also shows for the retrofit case where there is a high voltage (700 VAC+) and frequency (10K to 20 KHz) ballast in the lighting fixture the addition of a step down transformer to reduce the voltage back to 120 VAC followed by a bridge rectifier and then by a frequency down converter to reduce the frequency back to 50 to 60 Hz.
7. US 2007/0171625 A1 drives an LED from 120 VAC by first using a series connected capacitor to hold off excess voltage followed by a bridge rectifier, then an RC filter followed by a linear regulator (LM317). This is an adjustable voltage regulator and the driven LED is placed in series with its adjust pin and a resistor back to the return line. This circuit drives a single LED so the DC voltage created has been dropped down considerably from the 120 VAC source voltage.
8. U.S. Pat. No. 6,158,882 discloses a string of LEDs in a series parallel arrangement designed for aircraft interiors. Each leg of 3 LEDs has a ballast resistor in series with it. The lighting string is driven by a voltage regulator with a potentiometer for adjusting the brightness.
9. U.S. Pat. No. 7,295,176 discloses a method of adding a constant current offset to an LED driver current regulator. This circuit uses a switching regulator to control the LED current and claims greater efficiency with the addition of the constant current offset to the switching current.
10. US 2007/0242461 A1 shows the construction of a PAR type lamp. The LED driver circuit shown is quite complex utilizing 2 PCBs and numerous inductors and capacitors.
11. U.S. Pat. No. 7,210,819 B2 shows the construction of an AC LED where many LEDs are developed on a single die in an anti-parallel arrangement to facilitate the direct connection to an AC line voltage.

BRIEF DESCRIPTIONS OF THE DRAWINGS

SOLUTIONS

Figure 1:
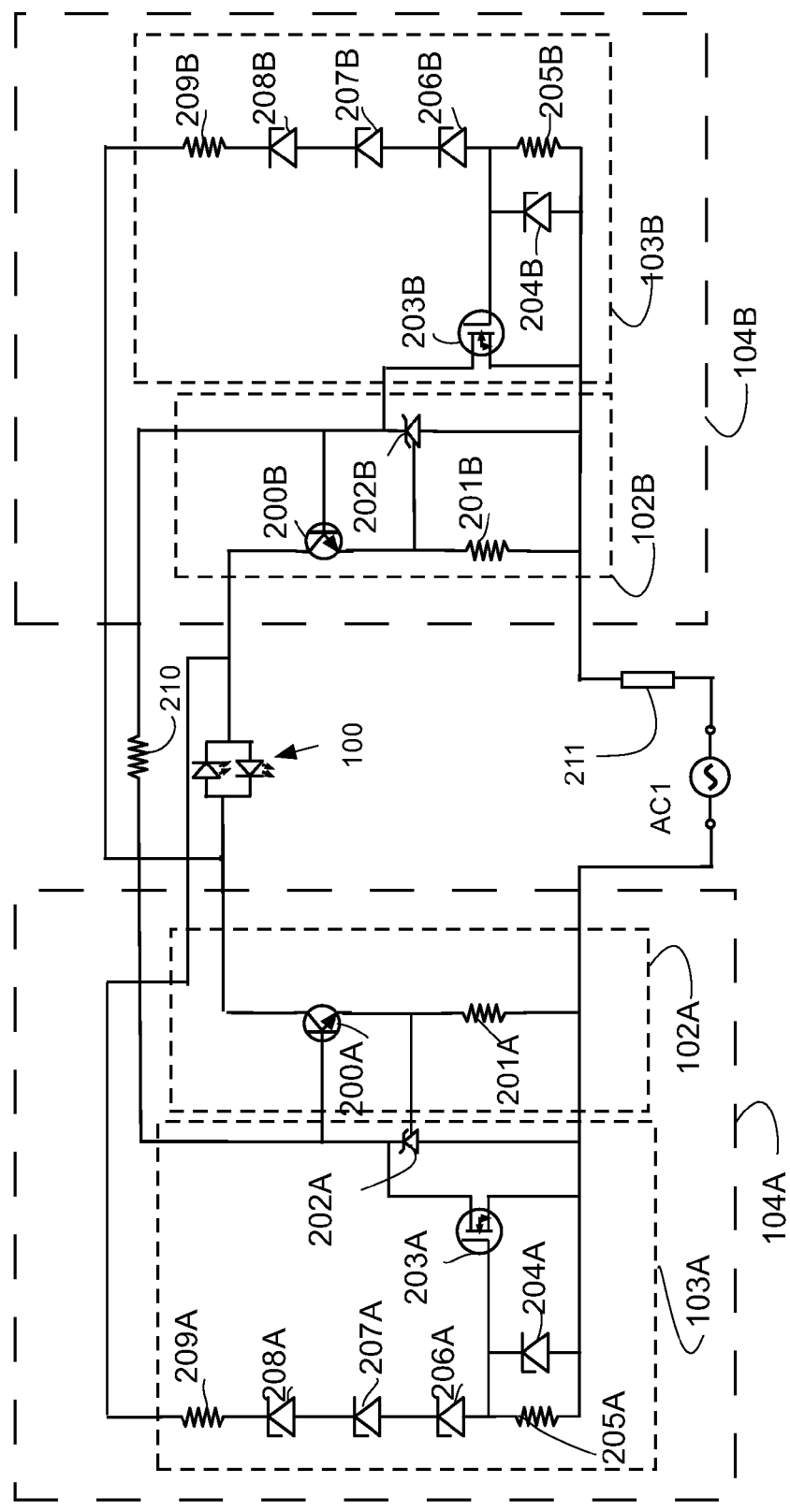
FIG. 1 is a schematic of a circuit for controlling the voltage and current to LEDs in a symmetric two-phase manner.

A dual phase voltage reference current regulator with over voltage protection used with an AC LED is shown in FIG. 1. Here a dual phase control is shown as Phase A 104A and Phase B 104B, which are each composed of a current regulator 102A and 102B and over voltage protection circuit 103A and 103B. The AC LED is represented by two LEDs in parallel in opposite directions Looking at Phase A, a current regulator 102A is created with a high voltage NPN transistor 200A that is cross connected with voltage reference 202A with base to cathode and emitter to reference as well as the sense resistor 201A. The collector-emitter breakdown voltage of 200A should be high enough to withstand the maximum surge voltage required. This maximum voltage can be defined by using a surge protector at the input to the circuit. For example, for a nominal 117 VAC line source voltage, a 230V MOV could be used and then 200A can be a 400V part and it should not be exposed to voltages greater than 400V. The anode of 202A ties to the other side of 201A and to the AC line source voltage via fuse 211. Phase B is handled in the same way with a circuit having respective parts 200B, 201B and 202B. There is also a bias resistor 210 that runs between the cathodes of the 2 voltage references 202A and 202B.

The function of these current regulators 102A 102B is dependent on the AC line voltage phase. During phase A (when the voltage at 202B anode is positive and at 202A anode is negative) 202B is passing current though its intrinsic diode to the base of 200B and via 210 to bias voltage reference 202A on. NPN transistor 200B is then passing current via its base-collector PN junction to the AC LED 100. The current exits the AC LED 100 into the phase A NPN 200A and through its collector-emitter to sense resistor 201A. The sense resistor 201A is connected to the now negative side of the AC line source voltage and so the current has made a complete loop back to its source while doing the work of lighting the LED.

As the LED current increases due to the increasing sine wave of the AC input voltage, the voltage drop across sense resistor 201A increases. Inside 202A, this voltage is being compared with an internal voltage reference (usually 2.50V or 1.49V) and when it begins to exceed this voltage the 202A begins to reduce the base current available to the NPN 200A and this folds back the current flow to the LED 100 by this negative feedback effect. The peak current is set by the value of the sense resistors 201A 201B by the formula:

$ILEDpeak=Vref/Rsense.$

When the AC line voltage sine wave drops back to zero and begins to go negative to 104B and positive to 104A, then 102A and 102B will switch functions. 102A now begins to supply current to the LEDs and 102B acts as the current regulator in the reverse manner that was previously described. The primary current flow is then through 202A anode to cathode to 200A base to collector through the AC LED 100 through 200B collector to emitter then through 201B sense resistor to fuse 211 and back to the AC source.

The purpose of the over voltage protection (OVP) circuits 103A and 103B is to protect the LEDs from voltage surges originating from the AC line. Their function is described next.

When Phase A of the AC voltage is in progress then current regulator 102A is regulating and 103A OVP is active. It is composed of a bias resistor 209A that is connected to the high voltage side of at the junction of 200A NPN collector and 100 in order to take a measure of the LED voltage and limit the Zener current. 208A, 207A and 206A are a stack of Zener diodes that together with Zener 204A set the maximum voltage. A stack of Zeners is used as they are lower cost than one large voltage Zener due to the way the semiconductors are manufactured. For the nominal 117 VAC application, the peak voltage is 165V and the sum of the three Zener voltages can be set about 10% higher than this at 182V. The bias resistor 209A sets the Zener current and absorbs the excess voltage during a voltage surge. Zener diode 204A limits the peak voltage at the gate of an N-channel MOSFET 203A below its maximum rating. The gate resistor 205A from gate to source of 203A pulls the gate voltage back down to zero when the over voltage condition passes.

During an over voltage event when the LED voltage exceeds the voltage set by the 4 Zener diodes 204A, 206A, 207A and 208A, a Zener current will begin flowing causing the gate voltage of MOSFET 203A to rise to the Zener voltage of 204A. This action fully enhances 203A causing its drain voltage to drop down close to its source voltage. The drain-source channel is connected across the voltage reference 202A and the base of NPN 200A of current regulator 102A causing the current regulator to shut down. The LED current then goes to zero until the voltage surge passes.

When Phase B is active, then OVP circuit 103B is active and 103A is inactive. When Phase A is active, then OVP circuit 103A is active and 103B is inactive. Note also that when Phase A is active and 102B is acting as a current source, some additional source current can flow through the body diode of the OVP MOSFET 203B. Vice versa, when Phase B is active and 102A is acting as a current source, some additional current can flow through the body diode of OVP MOSFET 203A. The percentage that flows through each probably depends on the relative forward voltage drop of the MOSFET body diode versus the voltage reference intrinsic diode. In SPICE simulations that I have performed it is often about half and half current sharing between the two components. Parts List for the Dual Phase AC LED Interface shown in FIG. 1.

| Part No. | Description |
| --- | --- |
| 100 | High Voltage AC LED |
| 200A/B | High Voltage NPN Transistor |
| 201A/B | Sense Resistor |
| 202A/B | Voltage Reference |
| 203A/B | N-Channel MOSFET |
| 204A/B | Zener Diode |
| 205A/B | Gate Resistor |
| 206A/B | Zener Diode |
| 207A/B | Zener Diode |
| 208A/B | Zener Diode |
| 209A/B | Bias Resistor for OVP |
| 210 | Bias Resistor for Current Regulators |
| 211 | Fuse |

Figure 2:
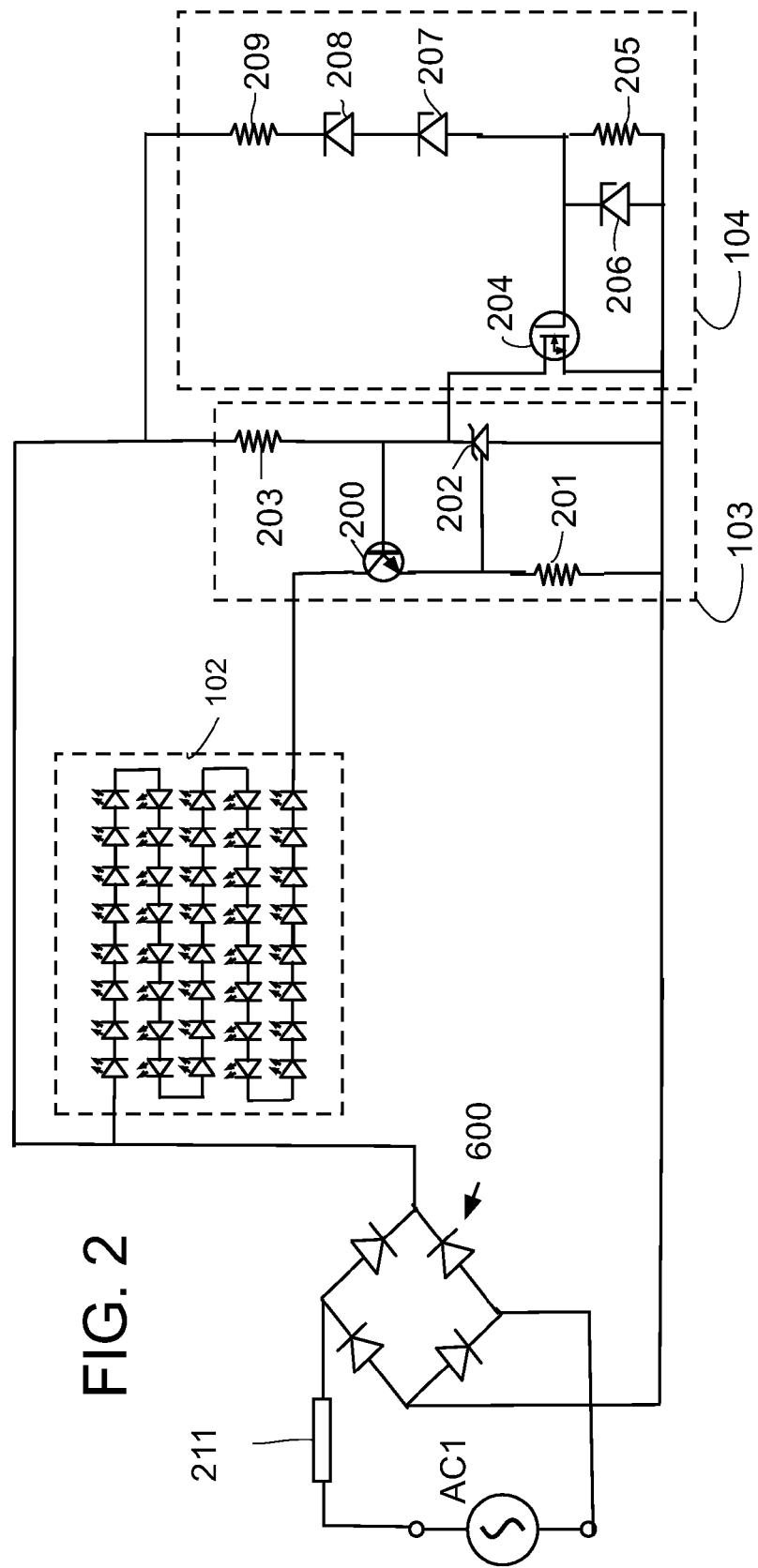
FIG. 2 is a schematic of a circuit for controlling the voltage and current to LEDs in a single-phase manner due to the inclusion of a bridge rectifier.

FIG. 2 shows another way to apply the same circuit. In this case rather than having dual regulators and OVP circuits only a single of each is used and instead the AC input voltage is first converted to a single-phase voltage via the full wave bridge rectifier 600. This is a cost reduction as fewer parts are required and the bridge rectifier 600 is less expensive than an extra current regulator 103 and over voltage protection circuit 104 combined. Also, a string of low voltage LEDs 102 is shown although the previously used AC LED could still be used. However only half of an AC LED would be conducting but there is newer single phase AC LEDs coming on the market.

The choice really depends on the type of lighting that is being manufactured using this method. When using a string of LEDs 102, the number used will depend on the forward voltage at the desired LED current. The total voltage drop across the string 102 needs to be less than the peak voltage of the AC source at its lowest nominal level. For an 117 VAC source, this might be taken as 10% below or 117V*1.414/1.10=150V. Lower than this will decrease the amount of dimming during a brownout (voltage droop) condition but will also reduce the efficiency during normal voltage conditions. Lower LED voltage drop also relates to fewer LEDs used in series, which will reduce the lumens output during normal voltage conditions. This is one of the tradeoff decisions to be made when creating a light source by this method.

In FIG. 2 the AC line is connected to fuse 211 and then to the bridge rectifier 600 that will always act as the voltage and current source for the LED string 102. The current regulator 103 has the same components and functions identically to the previously described FIG. 1 with the only difference being the connection to the bias resistor of FIG. 2 203, which connects to the bridge rectifier 600 rather than the alternate phase voltage reference as before. The OVP 104 also has the same components and functions as previously described. The FIG. 2 Parts List for AC Single Phase LED Interface is below.

| Part No. | Description |
| --- | --- |
| 600 | Bridge Rectifier |
| 211 | Fuse |
| 102 | String of Light Emitting Diodes (LED) |
| 200 | High Voltage NPN Transistor |
| 201 | Sense Resistor |
| 202 | Voltage Reference |
| 203 | Bias Resistor |
| 204 | N-Channel MOSFET |
| 205 | Gate Resistor |

| Part No. | Description |
|---|---|
| 206 | Zener Diode |
| 207 | Zener Diode |
| 208 | Zener Diode |
| 209 | OVP Bias Resistor |

Figure 3:
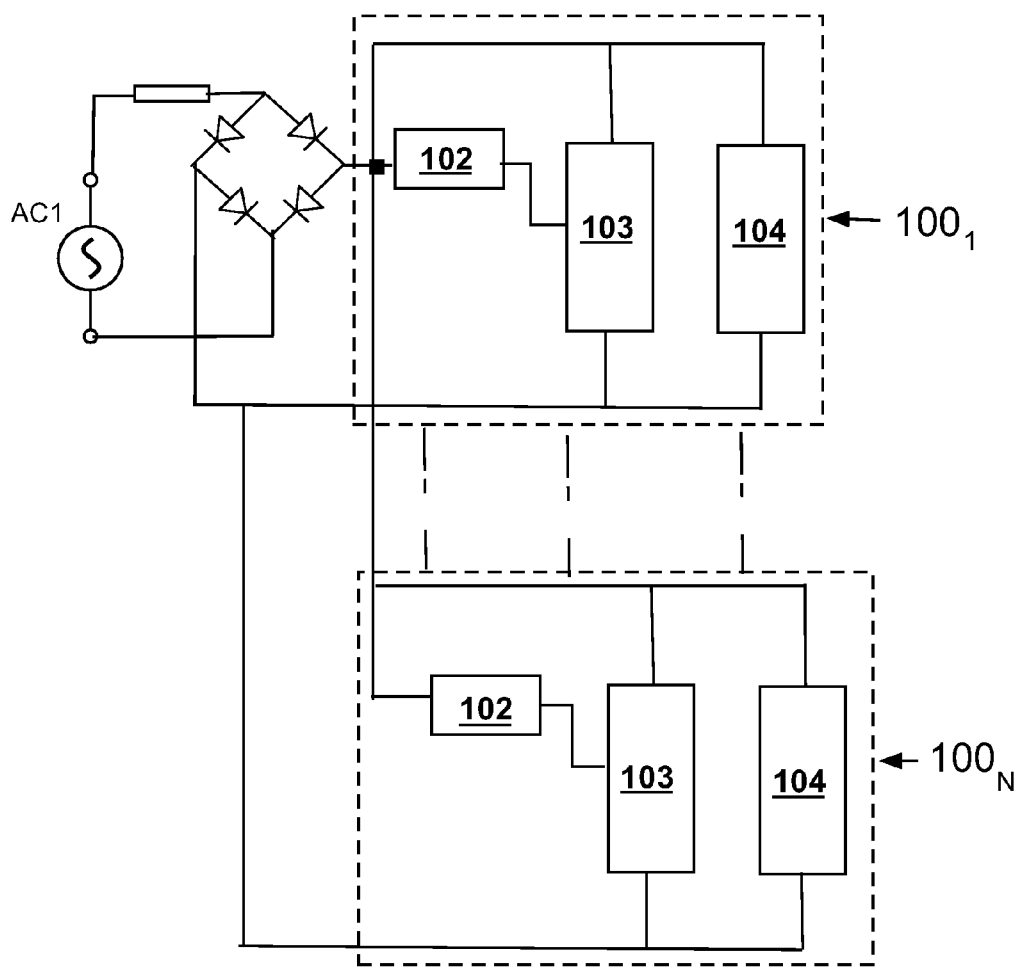
FIG. 3 is a schematic based on the circuit of FIG. 2 with multiple strings of LEDs, each string with its own regulation.

FIG. 3 shows the expansion of the circuit of FIG. 2 into multiple strings of LEDs. In this case, the same fuse 211 and bridge rectifier 600 are used to drive all of the LED strings with associated circuitry $100_1$ to $100_n$ as shown. An example where this can be useful is in the replacement of linear fluorescent bulbs with LED equivalents. For instance if the LED luminance requires 40 LEDs per foot for an equivalent output then 2 strings could be used for a 24" replacement bulb and 4 strings for a 48" replacement bulb.

Figure 4:
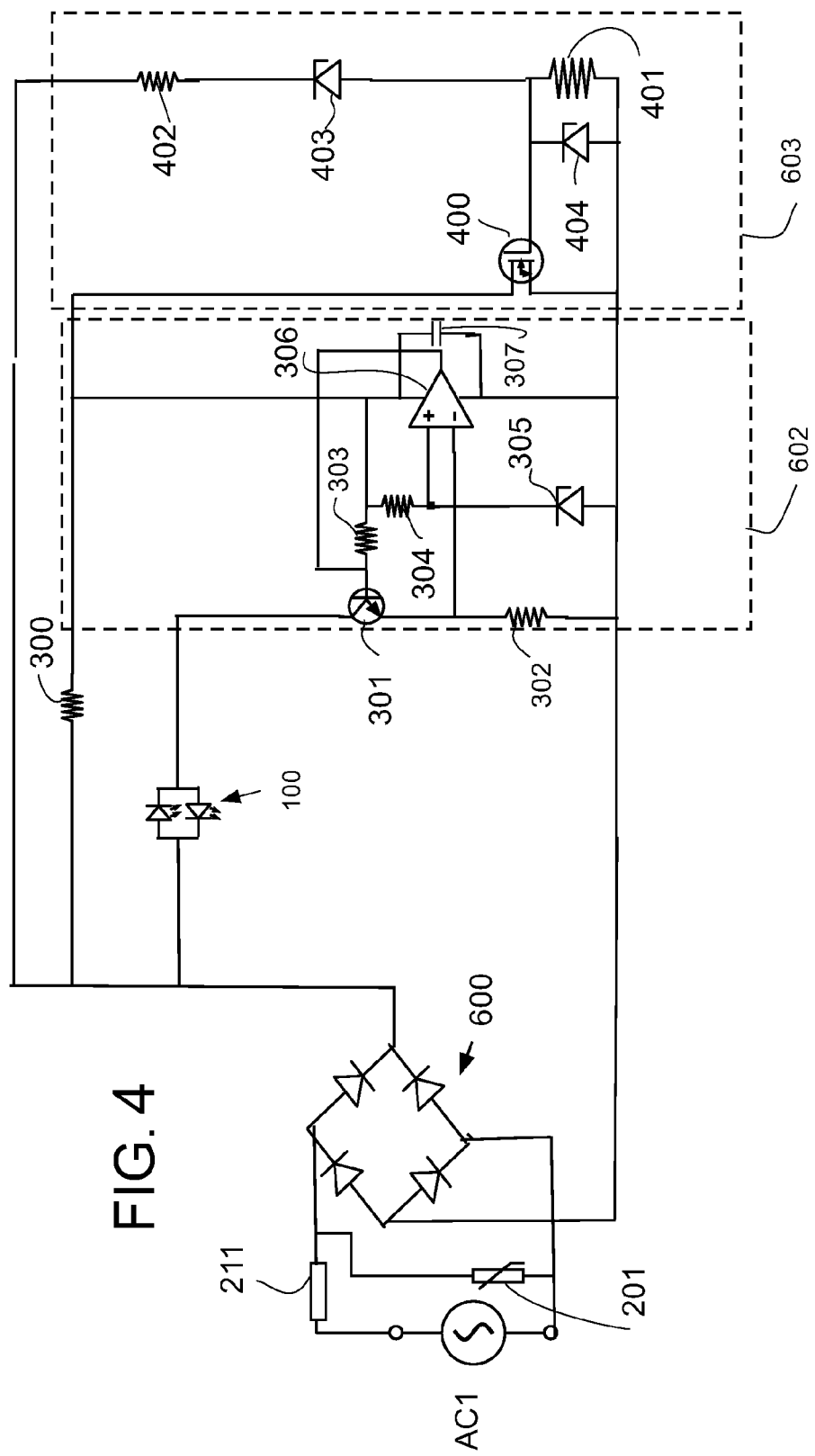
FIG. 4 is a schematic of a circuit similar to that of FIG. 2 but with the voltage regulator replaced by a comparator and a transistor.

FIG. 4 shows the same functions but with an LED current regulator created from a Comparator and NPN transistor. This current regulator replaces the voltage reference based current regulator shown in the previous figures and works in those circuits. This is a work around of my previous patent.

The AC line power source is represented by AC1 The input protection circuit that is composed of fuse 211 and Metal Oxide Varistor (MOV) 201. When a large voltage spike occurs on the input power line that is above the MOV's breakdown voltage, the MOV will present very low impedance and protect the following circuitry. A large current will pass through the MOV until the voltage spike has passed and if the duration is long enough to over-heat the fuse, then the fuse will open. The fuse 211 also protects against over current conditions due to a failure in the circuit by opening the current path to power and protecting the circuit. Fuse 211 can be a onetime acting component or a resettable fuse that will automatically close once the over current condition has passed.

The bridge rectifier 600 converts alternating current into pulsing DC current.

An AC LED that is designed to connect to the high line voltages or a string of low voltage LEDs that may be preferred in some lamp construction.

Section 602 is the LED current regulator circuit. This circuit is composed of components 300 through 307. The function of this circuit is described next.

As the LED current increases due to the increasing sine wave of the AC input voltage, the voltage drop across sense resistor 302 increases. The voltage from 302 is applied to the inverting input of Comparator 306. The non-inverting input of 306 is connected to a voltage reference 305 to set the maximum voltage across 302 (usually 2.50V or 1.49V). Resistor 300 supplies bias current for the current regulator circuit 602. The voltage from 300 also rises and powers 306 and 305 via its biasing resistor 304. The output of 306 will initially be high impedance as with none or low current flowing in 302, its voltage is lower than 305. This high impedance output allows the NPN transistor 301 to be turned on pulling its collector down close to its emitter potential. LED current will then flow once the sine wave voltage from the bridge output is high enough to supply the minimum required voltage across the LEDs 100 for them to begin conducting. When the LED current passing through sense resistor 302 causes its voltage drop to exceed the reference voltage 305, the output of Comparator 306 will go low and begin to reduce the base current available to the NPN transistor 301 and this folds back the current flow to the LED 100 by this negative feedback effect. The peak current is set by the value of the sense resistors 302 by the formula:

$ILEDpeak=Vref/Rsense$.

When the AC line voltage sine wave drops back towards zero enough, the sense resistor 302 voltage drop will begin to reduce below reference voltage 305, the Comparator 306 output will again go high allowing increase base current to 301 and begin reducing the voltage drop collector to emitter of 301 to control the current flow. Capacitor 307 supplies filtering across 306 power connections to prevent oscillations in 306.

The purpose of the over voltage protection (OVP) circuit 603 is to protect the LEDs from voltage surges originating from the AC line. Their function is described next.

When the AC voltage rises then current regulator 602 is regulating and OVP 603 is actively monitoring the rising voltage. It is composed of a bias resistor 402 that is connected to the output of bridge and limits the current into Zener Diodes 403 and 404. Diode 403 can be one or a stack of Zener diodes that together with Zener 404 set the maximum voltage allowed before LED 100 will be shut off. For the nominal 117 VAC application, the peak voltage is 165V and the sum of the three Zener voltages can be set about 10% higher than this at 182V. Zener diode 404 limits the peak voltage at the gate of an N-channel MOSFET 400 below its maximum rating. The gate resistor 401 from gate to source of 400 pulls the gate voltage back down to zero when the over voltage condition passes.

During an over voltage event when the LED voltage exceeds the voltage set by the Zener diodes 403 and 404, a Zener current will begin flowing causing the gate voltage of MOSFET 400 to rise to the Zener voltage of 404. This action fully enhances 400 causing its drain voltage to drop down close to its source voltage. The drain-source channel is connected across the current regulator circuit 602 causing the current regulator to shut down. The LED current then goes to zero until the voltage surge passes.

The following table lists the part of the circuit in FIG. 4.

| Number | Description |
|---|---|
| AC1 | AC Line Input Power Source |
| 602 | Current Regulator Circuit |
| 603 | Over Voltage Protection Circuit |
| 100 | AC LED (shown) or Low Voltage LED String |
| 211 | Fuse |
| 201 | Metal Oxide Varistor |
| 600 | Bridge Rectifier |
| 300 | Resistor, Bias for Current Regulator |
| 301 | NPN Transistor |
| 302 | Resistor, LED Current Sense |
| 303 | Resistor, NPN Base |
| 304 | Resistor, V-Reference Bias |
| 305 | Voltage Reference IC |
| 306 | Voltage Comparator |
| 307 | Capacitor, Filter |
| 400 | MOSFET, N-Channel |
| 401 | Resistor, Gate |
| 402 | Resistor, Bias for OVP Circuit |
| 403 | Zener Diode, OVP Reference |
| 404 | Zener Diode, Gate Voltage Limiting |

Figure 5:
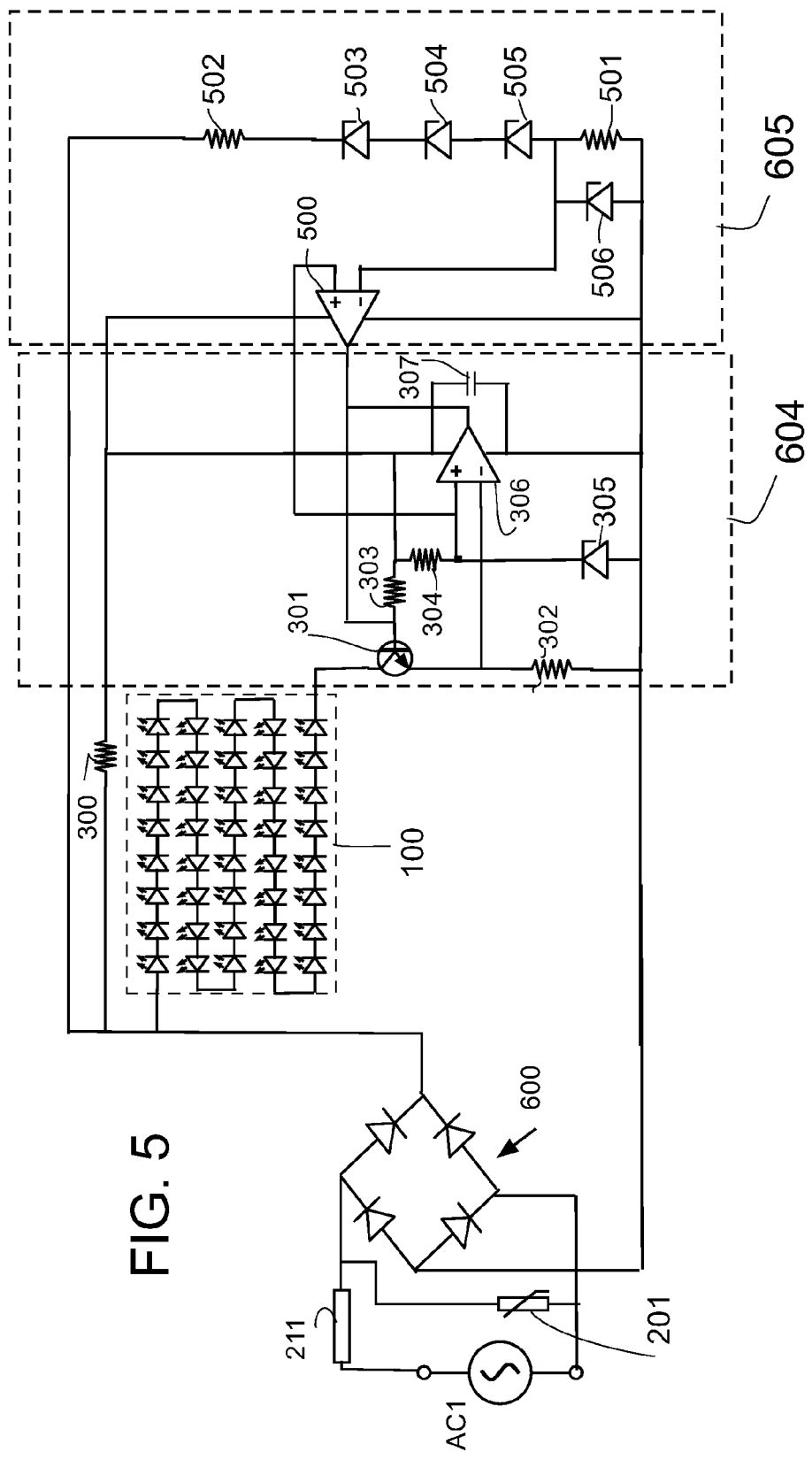
FIG. 5 is a schematic of a circuit similar to that of FIG. 4 but takes advantage of a dual comparator to use one half in current regulation and the other half in voltage regulation.

FIG. 5 shows a simpler version of the previous circuit where a dual open collector (drain) Comparator 306 500 is used to produce both the LED current regulator (limiter) 604 and voltage limiter 605. One comparator 306 is set up as before as the current limiter 102 and the second Comparator 500 replaces the N-Channel MOSFET from FIG. 4 to perform the voltage limiting function 103. The voltage reference 305 supplies the reference level at the non-inverting pin of 400 and the over voltage signal is produced by the same method with stacked Zener diodes 403 through 406 defining the over voltage level and 406 providing voltage limiting to the inverting pin of 400. Resistor 502 connects the Zener string to the sensed voltage at the output of the bridge rectifier 600 and also limits the Zener current. Bleed resistor 401 pulls the inverting input back down towards ground after each half sine wave phase to reset the over voltage circuit 605.

Initially with low to normal voltages, the voltage at the inverting input of 400 will be less than the reference voltage at the non-inverting input and this will result in a high impedance output. The output of 400 is tied to the base of NPN transistor 301 and when high it does not affect the operation of the current regulator 604. When the inverting input to 400 exceeds the reference voltage 305, then the output of 400 will go low and pull the base of 301 low that turns off 301 and the LED's 100 current flow. The current flow will remain off until the over voltage condition clears and the output of 400 goes back to a high impedance state. The output pins of Comparators 306 and 400 are tied together at the base of the NPN 301 and either one pulling low will turn off the LED current. Thus the LEDs 100 and the NPN transistor 301 are protected from excessive current and/or voltage and the maximum power that any circuit component dissipates is limited.

Likewise, the circuit of FIG. 5 could be used in multiple parts as shown in FIG. 3 where the circuitry $100_1$ to $100_n$ as shown would be replaced by the circuitry of FIG. 5.

The following table lists the parts of FIG. 5.

| Number | Description |
| --- | --- |
| AC 1 | AC Line Input Power Source |
| 604 | Current Regulator Circuit |
| 605 | Over Voltage Protection Circuit |
| 100 | AC LED or Low Voltage LED String (shown) |
| 211 | Fuse |
| 201 | Metal Oxide Varistor |
| 600 | Bridge Rectifier |
| 300 | Resistor, Bias for Current Regulator |
| 301 | NPN Transistor |
| 302 | Resistor, LED Current Sense |
| 303 | Resistor, NPN Base |
| 304 | Resistor, V-Reference Bias |
| 305 | Voltage Reference IC |
| 306 | Dual Open Collector Voltage Comparator Gate A |
| 307 | Capacitor, Filter |
| 500 | Dual Open Collector Voltage Comparator Gate B |
| 501 | Resistor, Bleed |
| 502 | Resistor, Bias for OVP Circuit |
| 503, 504, 505 | Zener Diode, OVP Reference |
| 506 | Zener Diode, Gate Voltage Limiting |

Advantages:

The circuit described is a low cost method of connecting Light Emitting Diodes to standard high voltage AC service and providing current regulation and over voltage protection. It has the advantage of simplicity and lower cost than other methods except for unregulated methods. It has a high Power Factor due to no reactive components. It has lower harmonics than switching regulators and oscillators that use a DC power supply and consequently has low EMI. It has long life approximating the 50,000+ hours of the LEDs due to not requiring large electrolytic capacitors that are prone to early failure. As there are few components and they are not large in size, the complete circuit can be included in a replacement bulb including small form factor types such as the MR16.

I claim:

1. An analog electronic circuit for driving a string of LEDs comprising:

a) input terminals for accepting connection to AC mains voltage; and
   b) a constant current regulation circuit operatively coupled to receive an AC voltage from the input terminals and to provide an output for connection to drive the string of LEDs; the current regulation circuit configured to regulate current flow through the string of LEDs on a half-cycle basis, to a predetermined value;
   c) a voltage sensing circuit configured to detect that the AC voltage coupled to the current regulation circuit exceeds a predetermined level, the voltage sensing circuit controlling the current regulation circuit such as to force the current regulation circuit to a non-conduction state when the predetermined level is exceeded; and
   the analog electronic circuit requiring no power storage capacitor.

2. The circuit of claim 1 further comprising a rectifier operatively coupled between the input terminals and the current regulator.

3. The circuit of claim 2 further comprising two or more distinct current regulating portions with two or more, respective, output connections for driving two or more distinct strings of LEDs, and having a common rectification stage.

4. The circuit of claim 1 having no rectification of the AC mains and comprising distinct, functionally mirror image circuitry for regulating current of positive and negative AC phases, respectively, and where the LEDs to be driven are so-called AC LEDs.

5. The circuit of claim 1 further comprising a compatible string of LEDs.

6. The circuit of claim 1 where the predetermined voltage level and controlling of the current regulation by the voltage sensing circuit is such that the current regulating circuit enters the non-conducting state at a voltage level below a level that would cause the power dissipation of at least one component in the current regulation circuit to exceed a predetermined level.

7. A circuit for powering LEDs from an AC source comprising:

a controllable constant current regulator arranged to be coupled to an AC source and configured to drive an LED string where the controllability of the current regulator is at least between a driving state where a constant current is provided during a phase angle providing a voltage above a minimum voltage, and an off state where substantially no current is provided;
   a voltage sensing circuit arranged to sense voltage applied to the controllable current regulator where a voltage above a predetermined level causes the current regulator to assume the off state, whereby the power dissipation of the current regulator is limited; and the circuit operable on a half-cycle basis and without requirement for filtered AC.

8. The circuit of claim 7 further comprising a rectifier interposed between the coupling for an AC source and the current regulator.

9. The circuit of claim 8 where the rectifier is a full-wave rectifier.

10. The circuit of claim 7 where the current regulator comprises a three terminal shunt voltage regulator component.

11. The circuit of claim 7 with two or more distinct constant current regulators in parallel providing for a respective two or more LED strings to be powered.

12. The circuit of claim 11 where at least one constant current regulator operates on a positive phase of the AC source and at least another of the constant current regulators operates on a negative phase of the AC source.

13. A method for powering a string of LEDs from unfiltered AC, the method comprising:
- applying an AC voltage to a circuit powering LEDs;
- regulating an AC flow of current to the string of LEDs to a predetermined, constant level on a phase-by-phase basis during phases of the AC voltage that meet a minimum diode-drop level;
- switching a circuit when a sense voltage related to the applied voltage exceeds a predetermined voltage level;
- ceasing the flow of current, the ceasing engendered by the switching; and
- where the predetermined voltage level and sense voltage is such as to cease the current flow at a point to prevent one or more regulating components from exceeding a chosen power rating.

* * * * *